US010029581B2

United States Patent
Cho

(10) Patent No.: US 10,029,581 B2
(45) Date of Patent: Jul. 24, 2018

(54) METHOD OF IMPROVING BRAKING PERFORMANCE THROUGH MOTOR TORQUE CONTROL OF VEHICLE

(71) Applicant: Hyundai Motor Company, Seoul (KR)

(72) Inventor: Woo Cheol Cho, Daejeon (KR)

(73) Assignee: Hyundai Motor Company, Seoul (KR)

( * ) Notice: Subject to any disclaimer, the term of this patent is extended or adjusted under 35 U.S.C. 154(b) by 119 days.

(21) Appl. No.: 15/277,567

(22) Filed: Sep. 27, 2016

(65) Prior Publication Data

US 2017/0297452 A1 Oct. 19, 2017

(30) Foreign Application Priority Data

Apr. 18, 2016 (KR) ........................ 10-2016-0046800

(51) Int. Cl.
| | | |
|---|---|---|
| *B60L 15/20* | (2006.01) | |
| *B60L 7/18* | (2006.01) | |
| *B60T 8/32* | (2006.01) | |
| *B60L 11/18* | (2006.01) | |
| *B60W 20/13* | (2016.01) | |

(Continued)

(52) U.S. Cl.
CPC .............. *B60L 15/2009* (2013.01); *B60L 7/18* (2013.01); *B60T 8/321* (2013.01); *B60K 6/28* (2013.01); *B60L 11/18* (2013.01); *B60L 2240/16* (2013.01); *B60L 2240/423* (2013.01);
(Continued)

(58) Field of Classification Search
CPC ........ B60L 11/18; B60L 15/2009; B60L 7/18; B60L 2240/16; B60L 2240/423; B60L 11/1809; B60W 20/13; B60W 30/143; B60W 30/02; B60W 30/18009; B60W 10/24; B60W 10/06; B60W 10/08; B60W 10/184; B60W 10/26; B60W 30/18127; B60W 30/18136; B60W 20/14;
(Continued)

(56) References Cited

U.S. PATENT DOCUMENTS

| 9,604,526 B2 * | 3/2017 | Gauthier ................ B60K 6/365 |
| 2009/0131215 A1 * | 5/2009 | Shamoto .................. B60K 6/32 |
| | | 477/3 |

(Continued)

FOREIGN PATENT DOCUMENTS

| JP | 2011-005977 A | 1/2011 |
| JP | 2014-220873 A | 11/2014 |

(Continued)

*Primary Examiner* — Behrang Badii
(74) *Attorney, Agent, or Firm* — Mintz Levin Cohn Ferris Glovsky and Popeo, P.C.; Peter F. Corless

(57) ABSTRACT

A method of improving braking performance through motor torque control of a vehicle includes: determining a relation between a vehicle wheel torque change amount and a driving acceleration change amount prior to a start of braking of the vehicle; calculating a target acceleration that is changed according to a driver's braking request when a driver presses a brake pedal to start the braking of the vehicle; detecting a real acceleration of the vehicle in real-time; comparing the real acceleration with the target acceleration; and compensating for a difference between the real acceleration and the target acceleration by increasing a regenerative braking amount through motor torque control when the real acceleration differs from the target acceleration.

6 Claims, 3 Drawing Sheets

(51) Int. Cl.
   *B60W 30/02*   (2012.01)
   *B60W 30/14*   (2006.01)
   *B60K 6/28*    (2007.10)
   *B60W 30/18*   (2012.01)
(52) U.S. Cl.
   CPC ............. *B60W 20/13* (2016.01); *B60W 30/02* (2013.01); *B60W 30/143* (2013.01); *B60W 30/18009* (2013.01)
(58) Field of Classification Search
   CPC .......... B60W 40/10; B60T 8/321; B60K 6/28; B60K 6/52
   See application file for complete search history.

(56)  References Cited

U.S. PATENT DOCUMENTS

2011/0035090 A1* 2/2011 Noguchi .............. B60W 10/119
                                                       701/31.4
   2012/0271499 A1* 10/2012 Inoue ..................... B60T 7/12
                                                       701/23
   2014/0180554 A1* 6/2014 Takahashi ........... B60W 30/143
                                                       701/70
   2016/0031446 A1* 2/2016 Gourara ................ B60W 10/02
                                                       701/54
   2017/0072780 A1* 3/2017 White ................... B60W 20/13

FOREIGN PATENT DOCUMENTS

JP         2014-231344 A    12/2014
   KR         2010-0011736 A    2/2010
   KR    10-2014-0085137 A      7/2014

* cited by examiner

METHOD OF IMPROVING BRAKING PERFORMANCE THROUGH MOTOR TORQUE CONTROL OF VEHICLE

CROSS-REFERENCE TO RELATED APPLICATION

This application claims under 35 U.S.C. § 119(a) the benefit of and priority to Korean Patent Application No. 10-2016-0046800 filed on Apr. 18, 2016, the entire contents of which are incorporated herein by reference as if fully set forth herein.

BACKGROUND

(a) Technical Field

The present disclosure relates generally to a method of improving braking performance through motor torque control of a vehicle, and more particularly, to a method of improving braking performance through motor torque control of a vehicle in which uniform braking force is provided by compensating for unintended change of braking force during braking.

(b) Background Art

In general, vehicles using a motor as a driving source, such as electric vehicles, hybrid vehicles, fuel cell vehicles, etc., perform regenerative braking co-operative control during braking. The total braking force of such a vehicle is the sum of frictional braking force by hydraulic pressure and regenerative braking force by a motor.

However, a friction material used in frictional braking has characteristics which can change according to the current temperature. Thus, even if the same hydraulic pressure is applied to the friction material, it can be difficult to acquire a uniform braking force. Particularly, if a brake is frequently used, vapor lock or fade occurs, and thus a driver feels that the brake is pushed rearwards or is not working well.

Vapor lock is a phenomenon in which, as a driver frequently uses a brake, brake pads (e.g., shoes) and discs (e.g., drums) overheat and generated heat is transmitted to a brake fluid to generate vapors in the brake fluid. In this case, even if the driver presses the brake, pressure transmission is not properly carried out and thus the brake does not work well.

Fade is a phenomenon in which, when a driver frequently uses a brake (in the same manner as in vapor lock), frictional braking force rapidly lowers due to overheating of the brake pads (e.g., shoes) and discs (e.g., drums). In this case, the brake does not work well.

Further, hydraulic pressure control causes low responsiveness and difficulty in attaining precise control, as compared to motor torque control. Thus, hydraulic pressure control causes difficulty in maintaining the constant sum of frictional braking force and regenerative braking force during regenerative braking co-operative control.

SUMMARY OF THE DISCLOSURE

The present disclosure has been made in an effort to solve the above-described problems associated with the related art. It is an object of the present disclosure to provide a method of improving braking performance through motor torque control of a vehicle in which uniform braking force is provided by compensating for unintended change of frictional braking force through motor torque control for regenerative braking so as to improve braking performance.

According to embodiments of the present disclosure, a method of improving braking performance through motor torque control of a vehicle includes: determining a relation between a vehicle wheel torque change amount and a driving acceleration change amount prior to a start of braking of the vehicle; calculating a target acceleration that is changed according to a driver's braking request when a driver presses a brake pedal to start the braking of the vehicle; detecting a real acceleration of the vehicle in real-time; comparing the real acceleration with the target acceleration; and compensating for a difference between the real acceleration and the target acceleration by increasing a regenerative braking amount through motor torque control when the real acceleration differs from the target acceleration.

The determining of the relation between the vehicle wheel torque change amount and the driving acceleration change amount may include determining the relation between the vehicle wheel torque change amount and the driving acceleration amount are deduced by calculating the driving acceleration change amount according to the vehicle wheel torque change amount and a road gradient of a road on which the vehicle drives.

The driving acceleration change amount may be calculated according to an equation of $\Delta a = k \times [\Delta T - g \times \sin(\Delta \theta)]$, where $\Delta a$ may be the driving acceleration change amount, $k$ may be a proportional constant, $\Delta T$ may be the wheel torque change amount, $g$ may be acceleration due to, and $\Delta \theta$ may be a road gradient change amount.

The calculating of the target acceleration may include calculating the target acceleration based on a target acceleration prior to detection of the driver's braking request and a demanded deceleration according to a driver demanded braking amount.

The compensating for the difference between the real acceleration and the target acceleration may include converting the difference between the real acceleration and the target acceleration into a wheel torque change amount based on the determined relation between the vehicle wheel torque change amount and the driving acceleration change amount, and increasing motor torque for regenerative braking by an amount corresponding to the converted wheel torque change amount.

The compensating for the difference between the real acceleration and the target acceleration may include variably controlling motor torque through feedback control using the motor torque as a control variable and the difference between the real acceleration and the target acceleration as an output value.

Other aspects and embodiments of the disclosure are discussed infra.

BRIEF DESCRIPTION OF THE DRAWINGS

The above and other features of the present disclosure will be described in detail with reference to certain embodiments thereof illustrated in the accompanying drawings which are given hereinbelow by way of illustration only, and thus are not limitative of the present disclosure, and wherein.

Figure 1:
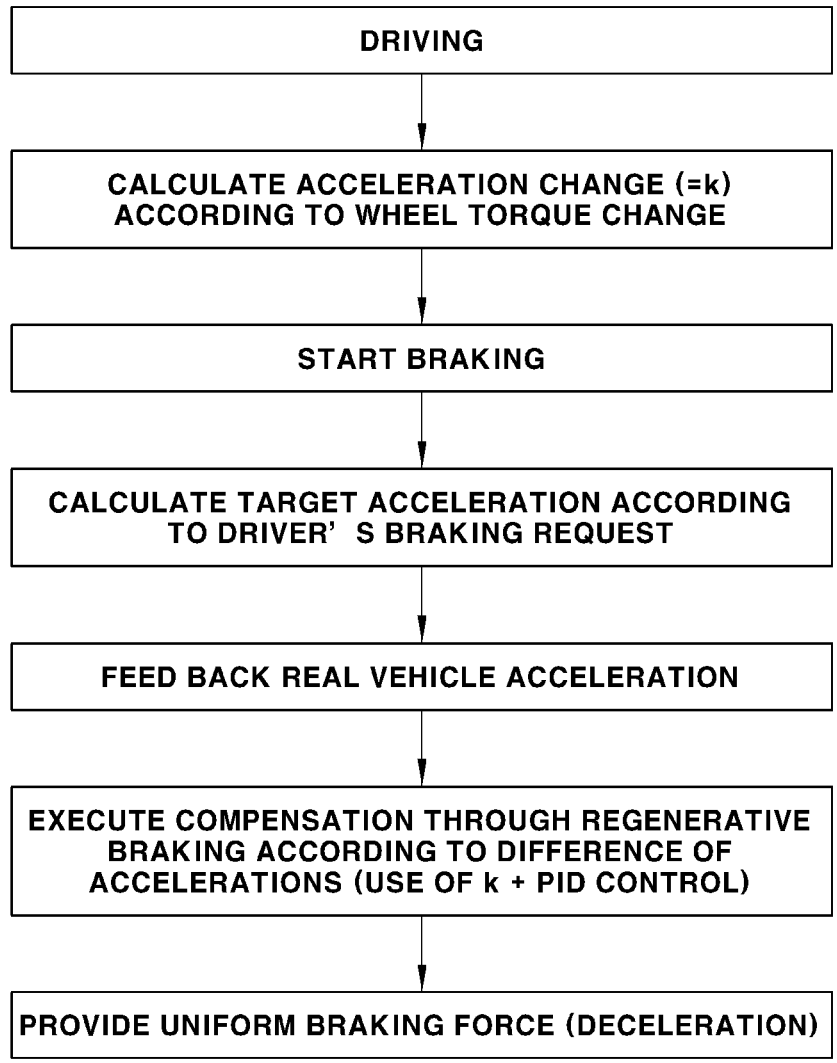
FIG. 1 is a flowchart illustrating a method of improving braking performance through motor torque control of a vehicle in accordance with embodiments of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment. In the figures, reference numbers refer to the same or equivalent parts of the present disclosure throughout the several figures of the drawing.

DETAILED DESCRIPTION OF THE EMBODIMENTS

Hereinafter reference will now be made in detail to various embodiments of the present disclosure, examples of which are illustrated in the accompanying drawings and described below. While the disclosure will be described in conjunction with embodiments, it will be understood that the present description is not intended to limit the disclosure to the embodiments. On the contrary, the disclosure is intended to cover not only the embodiments, but also various alternatives, modifications, equivalents and other embodiments within the spirit and scope of the disclosure as defined by the appended claims.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit equipped in a vehicle. The term "control unit" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the control unit in conjunction with one or more other components, as would be appreciated by a person of ordinary skill in the art.

In general, in the case of a vehicle executing regenerative braking co-operative control, in order to execute braking control to decelerate or stop the vehicle during driving, the total braking force of the vehicle with respect to braking force demanded by a driver is the sum of frictional braking force by hydraulic pressure constraining vehicle wheels (e.g., drive wheels) and regenerative braking force by a motor recharging a battery in the vehicle.

In the present disclosure, degradation of braking performance due to unintended change of frictional braking force may be prevented and uniform braking force may be provided by compensating for a difference between a frictional braking amount (e.g., a hydraulic braking amount), demanded during regenerative braking co-operative control, and a real frictional braking amount through motor torque control, which is rapidly and precisely executable.

Referring now to the disclosed embodiments, FIG. 1 is a flowchart illustrating a method of improving braking performance through motor torque control of a vehicle in accordance with embodiments of the present disclosure.

As exemplarily shown in FIG. 1, prior to a start of braking of a driving vehicle, a change amount of a driving acceleration according to a change amount of vehicle wheel torque is calculated. That is, a driver presses a brake pedal to start braking of the vehicle, a driving acceleration change amount according to a vehicle wheel torque change amount is calculated, thereby determining a relation between the wheel torque change amount and the driving acceleration change amount.

The relation between the wheel torque change amount and the driving acceleration change amount may vary according to conditions, such as the weight of the vehicle, a Rolling Resistance Coefficient (RCC) of tires, air resistance, a road gradient, etc. Thus, an acceleration change amount with respect to the same wheel torque change amount varies according to the above conditions. For instance, if the gradient of a road is changed during driving, the acceleration of the vehicle is changed even though wheel torque is not changed. Therefore, when an acceleration change amount is calculated, an acceleration change amount according to a road gradient is reflected therein.

A driving acceleration change amount $\Delta a$ based on a gradient $\theta$ of a road on which the vehicle is driving may be calculated through Equation 1 below.

$$\Delta a = k \times [\Delta T - g \times \sin(\Delta\theta)] \quad \text{[Equation 1]}$$

Here, k is a proportional constant which is determined as a constant value (e.g., the total weight of a vehicle) whenever the vehicle is started and drives, $\Delta\theta$ is a road gradient change amount, $\Delta T$ is a wheel torque change amount, and g is gravity acceleration. In general, the total weight (k) of the vehicle may be calculated based on an acceleration change amount.

By determining the relation between the wheel torque change amount and the driving acceleration change amount in such a manner, a change amount of wheel torque according to a change amount of a driving acceleration may be inferred based on such relation. For example, if a driving acceleration increases by 0.1 m/s$^2$ when a wheel torque change amount per unit time on a flat road is 10 Nm, a wheel torque value required to change the driving acceleration by 1 m/s$^2$ may be calculated as 100 Nm.

A Hybrid Control Unit (HCU) of the vehicle executes calculation for determining the relation between a wheel torque change amount and a driving acceleration change amount, i.e., calculation of a driving acceleration change amount according to a wheel torque change amount or calculation of wheel torque required to change a driving acceleration.

Thereafter, when the driver starts braking of the vehicle by pressing the brake pedal, a driver demanded braking amount is determined by a pressing amount of the brake pedal and a target acceleration changed according to the determined driver demanded braking amount (Nm) is calculated. When braking of the vehicle is started, a target acceleration of the vehicle varies according to the driver demanded braking amount.

When a driver's braking request is detected, a demanded deceleration according to the driver demanded braking amount is calculated, and a target acceleration changed according to the driver's braking request (i.e., a current target acceleration) is calculated based on a target acceleration prior to detection of the driver's braking request and the demanded deceleration. The HCU of the vehicle executes calculation of the changed target acceleration and, for example, the changed target acceleration may be calculated as the sum of the target acceleration prior to detection of the driver's braking request and the demanded deceleration according to the driver demanded braking amount.

Then, the HCU distributes the driver demanded braking amount (i.e., braking torque) into frictional braking torque (Nm) by hydraulic pressure and regenerative braking torque (Nm) by a motor. In more detail, when a driver's braking request is detected in the driving vehicle, an Integrated Brake Actuation Unit (iBAU) mounted in the vehicle calculates the driver demanded braking amount (Nm) based on the stroke of the brake pedal and distributes the calculated driver demanded braking amount (Nm) into regenerative braking and hydraulic braking. Here, the HCU determines a regenerative braking amount in consideration of the state of the vehicle, such as the speed of the motor, a battery charging state and temperature, and issues a regenerative braking execution command corresponding to the determined regenerative braking amount to a Motor Control Unit (MCU), and the executed regenerative braking amount is transmitted to the iBAU.

Accordingly, the iBAU adjusts hydraulic pressure supplied to the vehicle wheels to a target pressure based on the executed regenerative braking amount, thereby executing frictional braking control. That is, the HCU transmits a regenerative braking torque command to the motor through the MCU during regenerative braking co-operative control, and the iBAU determines frictional braking torque (i.e., the frictional braking amount) as a value acquired by subtracting regenerative braking torque from the driver demanded braking amount (Nm).

Thereafter, the HCU receives feedback of a real acceleration value detected from an acceleration sensor of the driving vehicle, compares the real acceleration with a current target acceleration, and, if it is determined that there is a difference between the target acceleration and the real acceleration as a result of the comparison, the HCU controls motor torque in consideration of the difference. Here, the HCU controls the motor torque based on the above-deduced relations between the vehicle wheel torque change amount and the driving acceleration change amount.

In more detail, unintended change of the frictional braking amount (Nm) is compensated for by controlling motor torque based on the difference between the target acceleration and the real acceleration and, particularly, when the real acceleration is less than the target acceleration, such a difference is converted into a wheel torque change amount based on the determined relation between the vehicle wheel torque change amount and the driving acceleration change amount and motor torque is increased as much as the wheel torque change amount, thereby increasing the regenerative braking amount and thus allowing an increment in the regenerative braking amount to compensate for a decrement in the frictional braking amount.

Motor torque for regenerative braking is increased in inverse proportion to motor torque for driving the vehicle, and such an increase in motor torque increases the regenerative braking amount. Motor torque for regenerative braking is controlled based on the relations between the wheel torque change amount and the driving acceleration change amount in such a manner, thereby improving initial responsiveness to compensation for the decrement in the frictional braking amount and improving tracking ability to the current target acceleration through feedback control, such as Proportional Integral Derivative (PID) control.

In PID control, motor torque is used as a control variable, the difference between the target acceleration and the real acceleration is used as an output value, and the motor torque is variably controlled. That is, tracking ability of the real acceleration to the target acceleration is increased by reflecting a result of former control in current control through feedback control of motor torque during regenerative braking co-operative control, and a braking amount (Nm), which is not acquired by frictional braking, is acquired by regenerative braking through such PID control.

As described above, the difference between the target acceleration and the real acceleration is compensated for through control of motor torque for regenerative braking. Thus, the same effect as control in which unintended change of frictional braking force during regenerative braking co-operative control is compensated for may be acquired.

In more detail, since the total braking force of a vehicle according to a driver demanded braking amount during braking of the driving vehicle is the sum of frictional braking force (e.g., hydraulic braking force) by hydraulic pressure constraining vehicle wheels and regenerative braking force of a motor for charging a battery, if there is a difference between frictional braking force demanded during braking and real frictional braking force and thus the frictional braking force is insufficient, braking torque applied to vehicle wheels is unintentionally changed and a driving acceleration is varied. Accordingly, there is a difference between a target acceleration of the vehicle changed according to the driver demanded braking amount and a real acceleration, corresponding to the difference between frictional braking force demanded during braking and real frictional braking force.

Therefore, by compensating for a wheel torque change amount corresponding to the difference between the target acceleration and the real acceleration through control of motor torque, the real acceleration of the vehicle rapidly and precisely tracks the target acceleration and consequently uniform braking force is provided to improve braking performance of the vehicle.

Now, effects of the above control method in accordance with embodiments of the present disclosure will be exemplarily described with reference to FIGS. 2 and 3.

Figure 2:
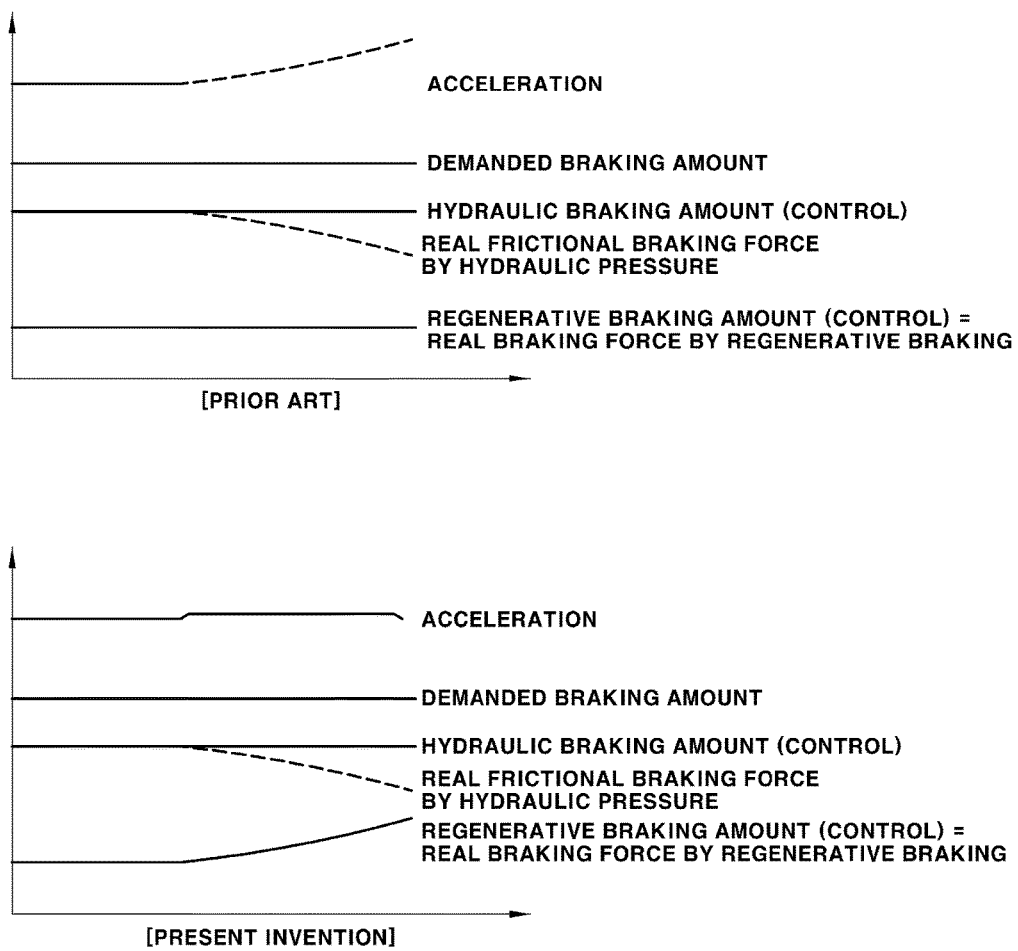
FIGS. 2 and 3 are graphs exemplarily illustrating effects of a method of improving braking performance through motor torque control of a vehicle in accordance with embodiments of the present disclosure.

First, with reference to FIG. 2, conventionally, if fade occurs, even though the same hydraulic control as the case prior to occurrence of fade is carried out, real frictional braking force by hydraulic pressure is decreased, and thus a driver feels that a brake pedal is pushed rearwards. On the other hand, according to embodiments of the present disclosure, when real frictional braking force by hydraulic pressure is decreased by fade and there is a difference between a target acceleration and a real acceleration, compensation for a braking amount by motor torque control for regenerative braking is carried out. Thus, rearward pushing of a brake pedal is prevented and uniform braking force is provided.

Figure 3:
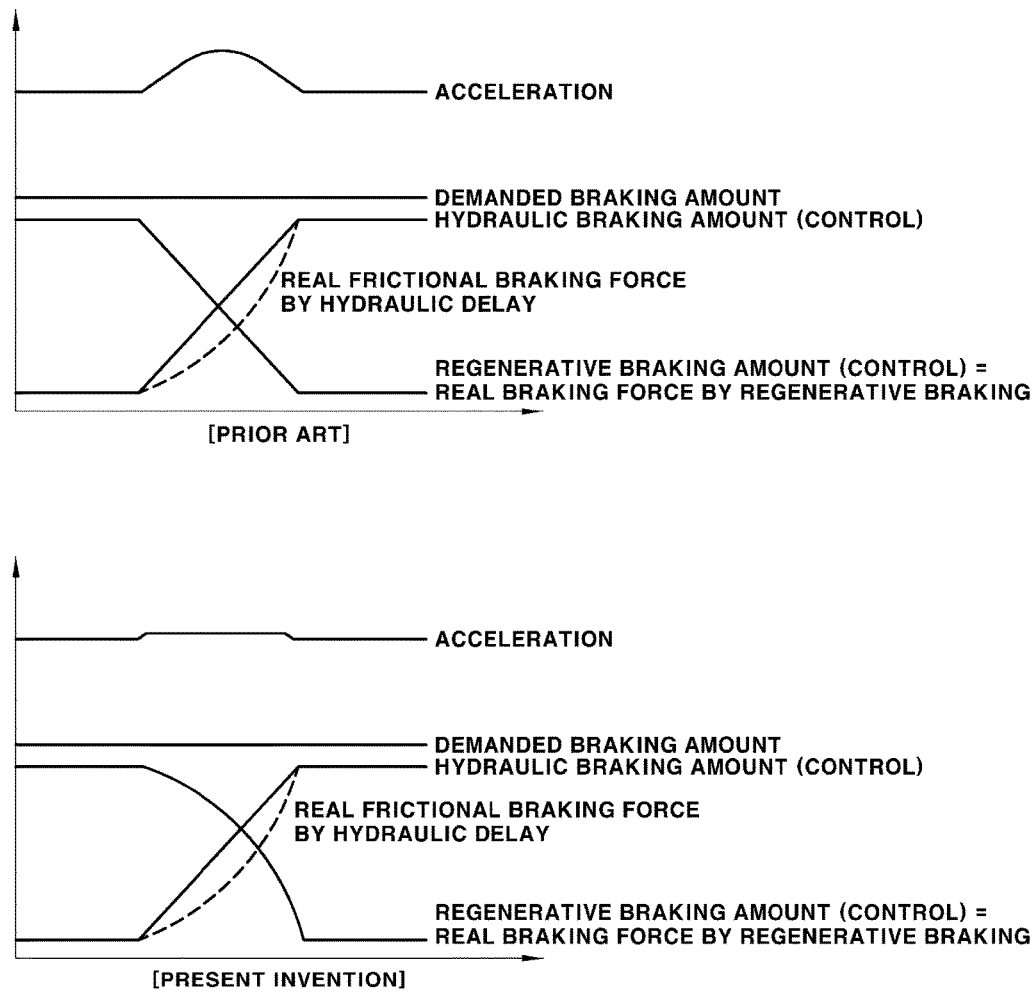

With reference to FIG. 3, during regenerative braking co-operative control, the sum of a regenerative braking amount and a frictional braking amount should be uniform so as to maintain uniform vehicle acceleration and deceleration. Conventionally, hydraulic pressure control for frictional braking has low responsiveness and thus causes low tracking ability to target hydraulic pressure, the sum of the regenerative braking amount and the frictional braking amount (e.g., hydraulic braking amount) is not uniformly maintained and is decreased due to delay of hydraulic control and thus rearward pushing of the brake pedal is generated. On the other hand, according to embodiments of the present disclosure, when the frictional braking amount (e.g., hydraulic braking amount) is decreased by delay of hydraulic control for frictional braking and the sum of the regenerative braking amount and the frictional braking amount is decreased, the regenerative braking amount is increased by motor torque control according to a difference between a target acceleration and a real acceleration. Thus, the sum of the regenerative braking amount and the frictional braking amount may be uniformly maintained, and consequently rearward pushing of the brake pedal may be prevented and uniform braking force may be provided.

As is apparent from the above description, in a method of improving braking performance through motor torque control of a vehicle in accordance with embodiments of the present disclosure, a relation between a wheel torque change amount and a driving acceleration change amount is determined by calculating the acceleration change amount according to wheel torque change amount, a real acceleration value is fed back in real-time, and a difference between a target acceleration and a real acceleration is compensated for through motor torque control for regenerative braking, thereby providing uniform braking force with respect to a driver demanded braking amount.

The disclosure has been described in detail with reference to embodiments thereof. However, it will be appreciated by those skilled in the art that changes may be made in these embodiments without departing from the principles and spirit of the disclosure, the scope of which is defined in the appended claims and their equivalents.

What is claimed is:
1. A method of improving braking performance through motor torque control of a vehicle, the method comprising:
   determining a relation between a vehicle wheel torque change amount and a driving acceleration change amount prior to a start of braking of the vehicle;
   calculating a target acceleration that is changed according to a driver's braking request when a driver presses a brake pedal to start the braking of the vehicle;
   detecting a real acceleration of the vehicle in real-time;
   comparing the real acceleration with the target acceleration; and
   compensating for a difference between the real acceleration and the target acceleration by increasing a regenerative braking amount through motor torque control when the real acceleration differs from the target acceleration.

2. The method of claim 1, wherein the determining of the relation between the vehicle wheel torque change amount and the driving acceleration change amount comprises:
   determining the relation between the vehicle wheel torque change amount and the driving acceleration amount are deduced by calculating the driving acceleration change amount according to the vehicle wheel torque change amount and a road gradient of a road on which the vehicle drives.

3. The method of claim 2, wherein the driving acceleration change amount is calculated according to an equation of $\Delta a = k \times [\Delta T - g \times \sin(\Delta\theta)]$,
   wherein $\Delta a$ is the driving acceleration change amount, k is a proportional constant, $\Delta T$ is the wheel torque change amount, g is acceleration due to gravity, and $\Delta\theta$ is a road gradient change amount.

4. The method of claim 1, wherein the calculating of the target acceleration comprises:
   calculating the target acceleration based on a target acceleration prior to detection of the driver's braking request and a demanded deceleration according to a driver demanded braking amount.

5. The method of claim 1, wherein the compensating for the difference between the real acceleration and the target acceleration comprises:
   converting the difference between the real acceleration and the target acceleration into a wheel torque change amount based on the determined relation between the vehicle wheel torque change amount and the driving acceleration change amount; and
   increasing motor torque for regenerative braking by an amount corresponding to the converted wheel torque change amount.

6. The method of claim 1, wherein the compensating for the difference between the real acceleration and the target acceleration comprises:
   variably controlling motor torque through feedback control using the motor torque as a control variable and the difference between the real acceleration and the target acceleration as an output value.

* * * * *